United States Patent [19]
Wang

[11] Patent Number: 5,340,901
[45] Date of Patent: Aug. 23, 1994

[54] TWO-COMPONENT, PRIMERLESS, ORGANIC PHOSPHORUS CONTAINING POLYURETHANE ADHESIVE

[75] Inventor: Chia L. Wang, Hudson, Ohio

[73] Assignee: GenCorp Inc., Fairlawn, Ohio

[21] Appl. No.: 55,406

[22] Filed: Apr. 29, 1993

Related U.S. Application Data

[63] Continuation of Ser. No. 886,529, May 20, 1992, abandoned, which is a continuation-in-part of Ser. No. 805,255, Dec. 9, 1991, Pat. No. 5,175,228.

[51] Int. Cl.$^5$ ............................................. C08G 18/10
[52] U.S. Cl. ........................................ 528/60; 528/61; 528/72; 528/905; 428/423.1
[58] Field of Search ................. 528/60, 61, 72, 905; 428/423.1

[56] References Cited

U.S. PATENT DOCUMENTS

| | | | |
|---|---|---|---|
| 3,442,827 | 5/1969 | Friedman | 521/169 |
| 3,501,329 | 3/1970 | Kent | 528/60 |
| 3,714,127 | 1/1973 | Fabris et al. | 528/75 |
| 3,786,030 | 1/1974 | Rice | 528/49 |
| 3,886,122 | 5/1975 | Fabris et al. | 528/75 |
| 3,980,594 | 9/1976 | Fabris et al. | 428/425 |
| 4,011,180 | 3/1977 | Lockwood et al. | 428/310 |
| 4,247,676 | 1/1981 | Kimball | 528/49 |
| 4,336,298 | 6/1982 | Schwarz | 428/285 |
| 4,346,144 | 8/1982 | Craven | 428/335 |
| 4,373,082 | 2/1983 | Kimball et al. | 528/60 |
| 4,390,678 | 6/1983 | LaBelle et al. | 528/60 |
| 4,444,976 | 4/1984 | Rabito | 528/60 |
| 4,452,944 | 6/1984 | Dawdy | 523/176 |
| 4,552,934 | 11/1985 | Rabito et al. | 525/459 |
| 4,624,996 | 11/1986 | Rizk et al. | 525/453 |
| 4,636,425 | 1/1987 | Johnson et al. | 428/198 |
| 4,663,377 | 5/1987 | Hombach et al. | 524/196 |
| 4,728,710 | 3/1988 | Goel | 528/58 |
| 4,743,672 | 5/1988 | Goel | 528/55 |
| 4,778,844 | 10/1988 | Blount | 524/710 |
| 4,876,308 | 10/1989 | Melby et al. | 524/780 |
| 4,923,756 | 5/1990 | Chung et al. | 428/480 |
| 4,931,487 | 6/1990 | Priester et al. | 521/163 |
| 4,954,199 | 9/1990 | Rains et al. | 528/85 |
| 5,002,806 | 3/1991 | Chung | 528/60 |
| 5,128,433 | 7/1992 | LeCompte et al. | 528/60 |
| 5,162,162 | 11/1992 | Yasuda et al. | 528/72 |
| 5,164,473 | 11/1992 | Dormish et al. | 528/60 |
| 5,175,228 | 12/1992 | Wang et al. | 528/48 |

FOREIGN PATENT DOCUMENTS

| | | | |
|---|---|---|---|
| 743156 | 9/1966 | Canada | 521/169 |
| 772670 | 11/1967 | Canada | 521/169 |
| 0010411 | 4/1980 | European Pat. Off. . | |
| 0063534 | 10/1982 | European Pat. Off. . | |
| 0248254 | 12/1987 | European Pat. Off. . | |
| 0328808 | 8/1989 | European Pat. Off. . | |
| 0349838 | 1/1990 | European Pat. Off. . | |
| 1803748 | 10/1967 | Fed. Rep. of Germany . | |
| 837120 | 6/1960 | United Kingdom . | |
| 2770741 | 12/1981 | United Kingdom . | |

OTHER PUBLICATIONS

"Polyurethane Elastomers with Hydrolytic and Thermooxidative Stability. I. Polyurethanes with N-Alkylated Polyamide Soft Blocks," Journal of Polymer Science, Part A: Polymer Chemistry, vol. 28, 1473–1482 (1990).

(List continued on next page.)

*Primary Examiner*—John Kight, III
*Assistant Examiner*—Rachel Johnson
*Attorney, Agent, or Firm*—Robert F. Rywalski; Daniel J. Hudak

[57] ABSTRACT

A two component primerless modified urethane adhesive having good adhesion can be utilized to bond various substrates together such as sheet molded compounds. The prepolymer component of the modified urethane contains a reacted hydroxyl intermediate and has a significant excess of free isocyanate. The curative component contains a polyol curing agent, an amine sag resistant agent, a phosphorus-type adhesion promoter, and optionally molecular sieves. The equivalent ratio of free NCO groups in the prepolymer component to OH groups plus any amine groups in the curative component is generally from about 0.90 to about 1.25.

12 Claims, No Drawings

OTHER PUBLICATIONS

"Polyurethane Elastomers with Hydrolytic and Thermooxidative Stability. II. Polyurethanes with N-Alkylated Polyurethane Soft Blocks," Journal of Polymer Science: Part A: Polymer chemistry, vol. 28, 3685–3699 (1990).

"Chemical Degradation of Polyurethane," V. Gajewski, 33rd Annual Polyurethane Technical Marketing Conference, Sep. 30–Oct. 3, 1990.

"Mechanisms of Thermal Decomposition in Totally Aromatic Polyurethanes," S. Foti, P. Maravigna, and G. Montaudo, Journal of Polymer Science: Polymer Chemistry Edition, vol. 19, 1679–1687 (1981).

"An Investigation of the Thermolysis Mechanism of Model Urethanes," K. J. Voorhees, F. D. Hileman, I. N. Einhorn and J. H. Futrell, Journal of Polymer Science: Polymer Chemistry Edition, vol. 16, 213–228 (1978).

"Thermal Stability of Isocyanate-Based Polymers. 2. Kinetics of the Thermal Dissociation of Model Urethane, Oxazolidone, and Isocyanurate Block Copolymer," P. I. Kordomenos, J. E. Kresta, and K. C. Frisch, Macromolecules, 1987, 20, 2077–2083.

"Thermal Stability of Isocyanate-Based Polymers. 1. Kinetics of the Thermal Dissociation of Urethane, Oxazolidone, and Isocyanurate Groups," P. I. Kordomenos and J. E. Kresta, Macromolecules, 1981, 14, 1434–1437.

"Side Reactions in the Formation of Polyurethanes: Stability of Reaction Products of Phenyl Isocyanate," M. Spirkova, M. Kubin, and K. Dusek, J. Macromol Sci.-Chem., A27(4), pp. 509–522 (1990).

"Mechanism of Thermal Degradation of Polyurethanes Investigated by Direct Pyrolysis in the Mass Spectrometer," A. Ballistreri, S. Foti, P. Maravigna, G. Montaudo, and E. Scamporrino, Journal of Polymer Science: Polymer Chemistry Edition, vol. 18, 1923–1931 (1980).

"Thermal Degradation of N-Substituted Polycarbamates," Elizabeth Dyer and Richard J. Hammond, Journal of Polymer Science: Part A, vol. 2, pp. 1–14 (1964).

"Thermal Degradation of the Polyurethane from 1,4–Butanediol and Methylene Bis(4–Phenyl Isocyanate)," N. Grassie and M. Zulfiqar, Journal of Polymer Science: Polymer Chemistry Edition, vol. 16, 1563–1574 (1978).

TWO-COMPONENT, PRIMERLESS, ORGANIC PHOSPHORUS CONTAINING POLYURETHANE ADHESIVE

CROSS-REFERENCE

This application is a continuation of application Ser. No. 07/886,529, filed on May 20, 1992, now abandoned, by Chia L. Wang, for "A Two-Component, Primerless, Organic Phosphorus-Containing Polyurethane Adhesive," which in turn is a continuation-in-part of U.S. application Ser. No. 805,255, filed Dec. 9, 1991, U.S. Pat. No. 5,175,228 for "Two-Component Primerless Urethane-Isocyanurate Adhesive Compositions Having High Temperature Resistance."

FIELD OF THE INVENTION

The present invention relates to a primerless, urethane adhesive for the bonding of various substrates such as fiber reinforced plastics.

BACKGROUND OF THE INVENTION

Urethane adhesives are used for bonding various substrates together such as automotive fiberglass reinforced parts.

U.S. Pat. No. 4,876,308 to Melby relates to a two-component type primerless polyurethane adhesive which has a high ratio of free NCO groups in the prepolymer component to the hydroxy groups and amine groups in the curative component of at least 1.2.

U.S. Pat. No. 4,923,756 to Chung et al relates to a laminated fiberglass reinforced polyester substrate made utilizing a primerless adhesive made from a first part which is a blend of a prepolymer component and an aliphatic isocyanate and a second component which is a curative. The prepolymer is the reaction product of a polyol and an aromatic isocyanate with a prepolymer product having from 3 to 15 percent of free isocyanate groups therein.

SUMMARY OF THE INVENTION

The organic phosphorus containing adhesive is made from a urethane prepolymer component and a curative component and is utilized to bond substrates such as sheet molded compounds (SMC). The urethane prepolymer component contains a large excess of free isocyanate after reaction with a hydroxyl terminated intermediate compound. The curative component contains a hydroxyl curing agent, an amine sag resistant agent, and an organic phosphorus compound. Although the ratio of free NCO groups of the prepolymer component to the hydroxy groups and amine groups of the curative component is low, generally less than 1.2, a primerless polyurethane adhesive is formed having good adhesion.

DETAILED DESCRIPTION OF THE INVENTION

High Temperature Resistant Two Component Urethane Adhesive

The present invention is an uncured two part composition which contains a urethane prepolymer or base component and a curative component. The prepolymer component is made from a polyol intermediate and a large excess of a polyisocyanate so that free NCO groups exist on the ends of the urethane prepolymer or on unreacted polyisocyanates, etc. The prepolymer component can also contain various conventional additives or fillers.

The polyol intermediate is a liquid polyether polyol or a polyester polyol, or combinations thereof, having primary hydroxy groups, a number average molecular weight of from 400 to 10,000 and desirably from 2,000 to 9,000. A wide range of polyether or polyester polyols can be used in making the adhesives of the present invention such as diols, triols, tetrols, and the like.

Polyether polyols are generally made by reacting an alkylene oxide having from 2 to 10 carbon atoms such as propylene oxide with a strong base such as potassium hydroxide, preferably in the presence of water, glycols and so forth. Polyether polyols can also be made by ring opening polymerization of tetrahydrofuran or epichlorhydrin using acid catalysts. Except for polyols made from ethylene oxide or polytetrahydrofuran, to obtain primary hydroxyl end groups, they are generally end capped with ethylene oxide. Examples of polyethers which can be utilized are those which are produced as by polymerization of tetrahydrofuran or epoxides (such as ethylene oxide, propylene oxide, butylene oxide, styrene oxide, or epichlorohydrin), or by addition of epoxide compounds (preferably ethylene oxide or propylene oxide), alone, in a mixture, or in succession, to starting components with reactive hydrogen atoms such as water, polyhydric alcohols, ammonia or polyfunctional amines. Grafted polyether polyols such as those grafted with styrene or acrylonitrile can also be utilized. A preferred polyether intermediate is a polypropylene ether diol or triol containing primary hydroxyl end groups.

In order to achieve specific properties which are influenced by the composition and content of polyurethane hard blocks, small amounts of polyhydric alcohols having 2 to 15 carbon atoms are optionally utilized in combination with the above-noted liquid polyether or polyester glycol intermediates. The amount of polyhydric alcohols is generally from 0 to 40 parts by weight and preferably from 0 to 10 parts by weight based upon 100 parts by weight of the polyether polyol intermediate, the polyester polyol intermediate, or combinations thereof.

The polyisocyanates which are utilized generally have the formula $R(NCO)_n$ where n is an integer of 2, 3 or 4 with approximately 2 being preferred. Because combinations of various polyisocyanates can be utilized, the equivalent amount of isocyanate can vary and often is not an integer. R is an aliphatic having from 2 to 20 carbon atoms with from 6 to 15 carbon atoms being preferred, an aromatic including an alkyl substituted aromatic having from 6 to 20 carbon atoms with from 6 to 15 carbon atoms being preferred, or combinations thereof. Aromatic diisocyanates and aliphatic substituted aromatic diisocyanates are desired since the aliphatic diisocyanates generally react too slow. Examples of suitable polyisocyanates include 1,6-diisocyanato hexane, 2,2,4- and/or 2,4,4-trimethyl hexamethylene diisocyanate, p- and m-tetramethyl xylene diisocyanate, dicyclohexylmethane-4,4'-diisocyanate (hydrogenated MDI), 4,4-methylene diphenyl isocyanate (MDI), p- and m-phenylene diisocyanate, 2,4- and/or 2,6-toluene diisocyanate (TDI), durene-1,4-diisocyanate, isophorone diisocyanate, isopropylene-bis-(p-phenyl isocyanate) and sulfone-bis-(p-phenyl isocyanate). Any combination of diisocyanates can also be employed. Combinations of slower reacting aliphatic with faster reacting aromatic diisocyanates can be advantageously used.

It is an important aspect of the present invention that free isocyanate, that is free NCO groups exist e.g., on the end of the prepolymer or on unreacted polyisocyanates, etc. Accordingly, the equivalent ratio of the amount of polyisocyanate utilized to make the prepolymer to the hydroxyl containing polyol intermediate (NCO/OH) is generally from 2 to 75 or 50, desirably from 10 to 40, and preferably from 15 to 35.

Various known additives are generally contained in the base of the prepolymer component in conventional amounts. Additives such as antioxidants, various ultraviolet light inhibitors, thickening agents are utilized. Various fillers tan also be utilized in conventional amounts. Examples of fillers which also serve to adjust the urethane prepolymer adhesive component viscosity include but are not limited to ground mica, talc, kaolin clay, calcium carbonate, calcium sulfite, silica, wollastonite, hollow glass microspheres, fibers, metallic oxides, ground quartz, metallic silicates and metallic powders. A preferred filler is talc. The amount of filler is generally an amount to produce a viscosity so that the prepolymer component can be readily pumped through processing equipment e.g., 5 to 100 parts by weight and preferably from 10 to 50 parts by weight per 100 parts by weight of the prepolymer.

Any conventional pigment or dye can be utilized in conventional amounts. Dyes, provided that they do not interfere with the various urethane reactions, can be utilized in either the prepolymer component, the curative component, or both.

The prepolymer component is made by adding the hydroxyl terminated polyol intermediate to a reactor along with the various additives. The reactor contents are heated, the ingredients mixed and a vacuum applied to remove moisture. The one or more polyisocyanates are added after moisture has been removed. In the absence of a catalyst, the formation of the prepolymer generally occurs at an elevated temperature, i.e., room temperature to about 150° C., with the temperature depending upon the specific type of hydroxyl terminated polyols and polyisocyanates. A urethane catalyst in the prepolymer component will cause the reaction to occur at a lower temperature.

The curative component generally contains a polyol curing agent which serves as a cross linking agent, a primary amine, and a trimerization catalyst. The polyol cross linking agent can be free of nitrogen and can be the same as the intermediate polyol so described above utilized to form the prepolymer. An essential requirement of the polyol is that it be of a type such that a crosslinked polyurethane adhesive is formed upon cure of the adhesive composition. Thus, if the polyol intermediate and the polyisocyanate used to make the urethane prepolymer are essentially difunctional, the polyol curative should contain sufficient hydroxyls containing more than two OH groups per molecule so that a stable crosslinked network is formed when the curative is utilized. Alternatively, if either the intermediate polyol or the polyisocyanate used to make the prepolymer adhesive base has a functionality significantly greater than 2, the curative polyol may have a functionality of 2, or optionally greater than 2, to form the crosslinked network. Examples of curative polyols include a polyether or a polyester polyol having a number average molecular weight of from about 400 to about 10,000, desirably 2,000 to 9,000, such as the various above-noted polyol intermediates, or triols, tetrols, pentols, hexols. Also included within the definition of polyols according the present invention are the carbohydrates such as disaccharides and monosaccharides, along with reaction products thereof with alcohols having from 1 to 5 carbon atoms such as alkyl glucoside.

Examples of preferred polyol crosslinking agents include ethylene or propylene oxide adducts of trimethylol propane, pentaerythritol, glycerol, alkyl glucosides, or carbohydrates, with the propylene oxide adduct of pentaerythritol being preferred.

The curative component generally contains a primary aliphatic or aromatic amine which provides sag resistance after the prepolymer component is mixed with the curative component. The primary amine can be a di- or multifunctional primary amine having from about 1 to about 14 carbon atoms with 2 to 8 carbon atoms being preferred. Examples of suitable primary amine compounds include diethylenetriamine, ethylenediamine, tetramethylenediamine, pentamethylenediamine, hexamethylenediamine, 2,5-diamine-n-hexane, xylyene diamine, various naphthalene diamines such as 1,8-naphthalene diamine, and 1,3-diaminopropanol-2. The primary amine generally reacts with an equivalent amount of a free isocyanate group (NCO) in the prepolymer component to produce a polyurea. The reaction is generally very quick and the polyurea produced forms a strong hydrogen bonded network and significantly increases the viscosity of the mixed adhesive before cure and thereby provides sag resistance. An effective amount of the polyurea is utilized to prevent sag in the end product before it cures. An effective amount is generally from 0.1 to 5 parts by weight and preferably from 0.5 to 3 parts by weight per 100 parts by weight of the curative component.

An amount of the polyol curing or cross linking agent is utilized so that in association with the primary amine, the equivalent ratio of the free NCO groups of said prepolymer component to the curative OH +NH$_2$ groups of the curative component is from 1.2 to 2.0, desirably from 1.2 to 1.6 and preferably from 1.3 to 1.5. The utilization of a high excess of polyisocyanate results in various groups in addition to urethanes such as allophanate, biuret, carbodiimide, and the like. Such a high equivalent range results in a cured polyurethane adhesive which has good adhesion without the need of any surface pretreatment, i.e., the surface is treatment-free. By the term "treatment-free" it is meant that the substrate need not be further treated mechanically, with a solvent or with other chemical treatment. The adhesive is utilized to bond or adhere FRP to FRP, FRP to a metal, FRP to a painted metal, and FRP to various plastic substrates.

An important aspect of the present invention is the utilization of trimerization catalysts which have been found to impart improved high temperature stability to the adhesive.

Suitable catalysts are the various amines of the general formula

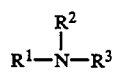

wherein R$^1$, R$^2$, R$^3$, independently, is hydrogen or an alkyl having from 1 to 8 carbon atoms, or an aralkyl having a total of from 7 to 15 carbon atoms, with specific examples including (C$_2$H$_5$)$_3$N, (CH$_3$)$_2$NCH$_2$C$_6$H$_5$, and the like.

Another suitable trimerization catalyst family are the phosphines having the formula

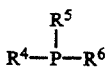

where $R^4$, $R^5$ and $R^6$, independently, is an alkyl having from 1 to 8 carbon atoms, with specific examples including triethyl phosphine, trimethyl phosphine, and the like.

Still another suitable catalyst group are the alkoxides represented by the formula $R^7OM$ where M is an alkali metal such as potassium, sodium, or lithium, or a borate, and $R^7$ is an alkyl having from 1 to 8 carbon atoms, with specific examples including $CH_3ONa$, $C_2H_5ONa$, and $C_4H_9OK$.

A still further suitable trimerization catalyst are the various metal oxides as generally represented by the formula

MO with a specific example being $Li_2O$.

Other catalysts are the hydroxides of quaternary N,P,As,Sb, such as $C_6H_5CH_2N(CH_3)_3OH$, the carboxylates as generally represented by the formula $(R^8COO)_xM$, where M is K, Na, Ca, Fe, Mg, Hg, Ni, Co, Zn, Cr, Al, Sn, V, or Ti, where $R^8$ is H, an alkyl having from 1 to 10 carbon atoms, or an aryl alkaryl having from 6 to 15 carbon atoms and x is 1 to 6 with specific examples including $Ca(CH_3COO)_2$, $CH_3COOK$, $C_6H_5COONa$, $(C_3H_7COO)_4Ti$, $C_7H_{15}COOK$, and HCOONa, and various organometallics containing Zn, Si, Sn, Pb, or Sb, and O,N or S with specific examples including $R'_3Si$—$SR''$, $R'_3Sn$—$SR''$, $R'_3Sn$—$S$—$SnR''_3$, $R'_3Sn$—$OR''$, $R'_3Pb$—$NR''_2$, $R'_3Sb$—$(OR'')_2$, $R'_3Sb$—$(OCOR'')_2$, $R'Zn$—$OR''$, $R'Zn$—$NR''_2$, $(C_4H_9)_2Sn_nO$, where $R'$ and $R''$, independently, is an alkyl, an aryl, or an alkenyl group having a total of from 1 to about 15 carbon atoms.

Still other suitable catalysts are the metal chelates such as diethyldipyridylnickel, bis(dipyridyl)nickel, tetrakis(triphenylphosphine)nickel, hydrides such as $NaBH_4$ (sodium borohydride), $LiAlH_4$ (lithium aluminum hydride), sodium dihydrobis(2-methoxyethoxy)aluminum hydride, i.e.,

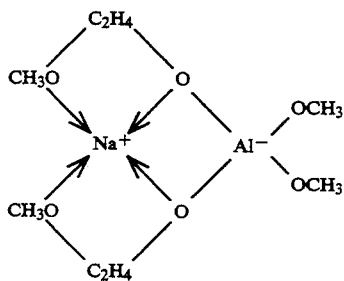

organic acids, inorganic acids, and Lewis acids, such as HCl, $(CO_2H)_2$, $AlCl_3$, and conventional Friedel-Crafts catalysts.

Another suitable trimerization catalyst are the various combination catalysts such as amines/epoxides, amines/alcohols, amines/alkylene carbonates, amines/alkylene imides, amines/carboxylic acids, amines/peroxides, ammonium hydroxides/carbamates.

Still another suitable trimerization catalyst are the a) sulfonium zwitterions as generally represented by the formula

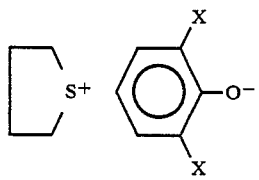

wherein X is H, Cl, an alkyl group having from 1 to 10 carbon atoms, and b) amine-imide zwitterions as generally represented by the formula

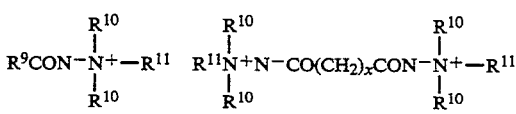

where x is from 2 to 16, $R^9$, each $R^{10}$, independently, is an alkyl group having from 1 to 10 carbon atoms, and $R^{11}$ is $CH_2CH(OH)CH_3$, or $CH_2CH_2OH$.

Another suitable trimerization catalyst are the quaternary ammonium carboxylates as generally represented by the formula

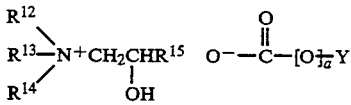

where
a is 0 or 1, where
$R^{12}$, $R^{13}$, $R^{14}$, independently is alkyl or hydroxyalkyl of $C_{1-20}$, cycloalkyl of $C_{3-8}$, aralkyl, aryl, alkenyl of $C_{2-20}$, alkynyl of $C_{2-6}$, with alkyl $C_1$ to $C_4$ being preferred;
$R^{15}$ is H, phenyl, alkyl of $C_{1-15}$, alkenyl of $C_{2-15}$, alkynyl of $C_{2-6}$, hydroxy alkyl of $C_{1-9}$, ketoalkyl of $C_{3-15}$, alkoxy alkyl of $C_{2-20}$, with alkyl $C_1$ to $C_4$ preferred, and where
Y is H, alkyl of $C_{1-18}$, alkenyl of $C_{2-15}$, aromatic of $C_6$ to $C_{20}$ such as benzoate or methoxybenzyl, with alkyl $C_2$ to $C_{10}$ preferred.

A specific example of such a compound is TMR-2, manufactured by Air Products and Chemicals, Inc., which is trimethyl-2-hydroxypropyl ammonium 2-ethyl hexanoate. Related compounds include TMR, TMR-3, and TMR-4, wherein $R^{12}$, $R^{13}$ and $R^{14}$ is an alkyl independently having from 1 to 4 carbon atoms, $R^{15}$ is an alkyl having from 1 to 4 carbon atoms, and y is an alkyl having from 2 to 10, desirably 4 to 8 carbon atoms.

The quaternary ammonium carboxylates are preferred.

Other suitable trimerization catalysts include compounds such as
2,4,6 tris(dimethylaminomethyl)phenol
N,N'N''tris(dimethylaminopropyl)sym-hexahydrotriazine.

Examples of desirable trimerization catalyst include benzyl trimethylammonium hydroxide, benzyl trimethylammonium methoxide, potassium acetate, potassium ethoxide, potassium octoate, potassium phthalimide, sodium dihydrobis (2-methoxy ethoxy) aluminum hydride, sodium ethoxide, sodium methoxide, 2,4,6 tris(-dimethylaminomethyl)phenol, N,N',N"tris(dimethylaminopropyl)sym-hexahydrotriazine, trimethyl-2-hydroxypropyl ammonium 2-ethyl hexanoate (TMR-2), and similar tertiary amines such as TMR, TMR-3 and TMR-4, which are trade secrets of Air Products, and tetramethylammonium-2-ethyl hexoate (TMAO), with trimethyl-2-hydroxypropyl ammonium 2-ethyl hexanoate being highly preferred.

The amount of the trimerization catalyst is from 0.01 to 1.0 percent by weight, desirably from 0.02 to 0.50 percent by weight, and preferably from 0.05 to 0.5 percent by weight based upon a total weight of the cure component.

The use of a urethane catalyst, which is generally a liquid, is optional. In combination with the trimerization catalysts, described above, urethane catalysts are used to adjust open time or pot life of mixed adhesives. Typically, a urethane catalyst is utilized, in the curative component, although it can be utilized in the prepolymer component, or in both components. Suitable urethane catalysts include tin catalysts such as stannous carboxylates and dialkyl tin salts of carboxylic acids, trialkyltin hydroxide, dialkyltin oxide, or dialkyltin chloride can be utilized. As an alternative or in addition to the above tin compounds, various tertiary amines can be used. Tin catalysts, when utilized, are used in amounts of 0.5 parts or less, i.e., in the range of 0.01 to 0.5 parts, by weight per 100 parts by weight of the component in which it is utilized, i.e., the curative component. The tertiary amine catalysts, when utilized, can be used in amounts of 0.01 to 5 parts by weight per 100 parts by weight of the component in which it is utilized. At least 0.01 part of at least one type of catalyst should be present. In addition to the above catalysts, organo-mercury or organic bismuth compounds wherein the organic portion is an aliphatic and preferably an alkyl having from 2 to 20 carbon atoms can be utilized in an amount from 0.01 to 1.0 parts by weight per 100 parts by weight of the prepolymer or curative component.

In addition to the above compounds optionally a small portion of the hydroxyl-terminated polyol intermediate utilized in the prepolymer component can also be contained within the curative component in an amount such that the total weight of the curative component is generally equal or relatively similar to the total weight of the prepolymer component. This aspect is for ease of application and ease of combining equal weight volumes of the two components. It is to be understood that any weight ratio of the curative component to the urethane prepolymer component can be utilized so long as the equivalent ratio of free NCO groups in the prepolymer component to curative OH and NH2 groups of the curative component is within the above ranges, and the ratio of free NCO groups to the total OH groups of hydroxy-terminated polyol intermediate, regardless of its location, is as set forth above.

Another aspect of the present invention is use of a shelf life stabilizer in the two part urethane system. Generally, the stabilizer is in the curative component although it can be in the prepolymer component or both. Suitable shelf life stabilizer include molecular sieves. A specific example is Sylosiv 4Å, an approximately 4Å sodium, calcium, or potassium aluminosilicate molecular sieve available from W. R. Grace Company. The amount of stabilizer is generally from 0.1 to 15.0 percent by weight and preferably from 0.5 to 10 percent by weight based upon the weight of the curative component or system, or the prepolymer component or system.

Another aspect of this invention is the use of phosphorus-type adhesion promoters in the curative component or the base component, or both, to prevent adhesion loss after the urethane adhesive is applied to a part which is subjected to high temperature e.g., 400° F. (204° C.) for 1 hour. The phosphorus type compounds are generally liquid and include compounds represented by the formula

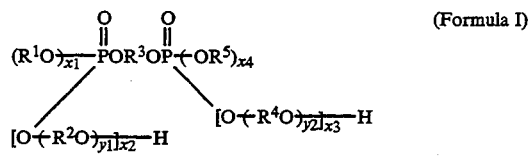

(Formula I)

where $R^1$, $R^3$, $R^5$, independently, is an alkyl having from 1 to 15 carbon atoms wherein $R^2$ and $R^4$ independently, is an alkyl having from 1 to 6 carbon atoms, where $Y_1$ or $Y_2$, independently, is from 0 to 20, and wherein $x_1+x_2=2$, wherein $x_3+x_4=2$; and wherein $x_1$, $x_2$, $x_3$, or $x_4$ is 0, 1, or 2. A specific example of such a compound is Vircol-82 manufactured by Allbright and Wilson Corporation and has the formula

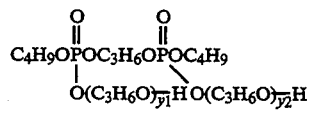

having a molecular weight of about 548 and $y_1+y_2=3.4$. Another phosphorus type compound can be represented by the formula

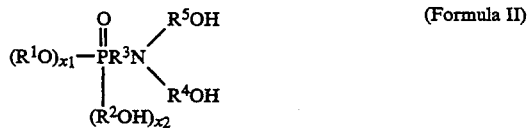

(Formula II)

wherein $R^1$, $R^2$, $R^3$, $R^4$, and $R^5$, independently, is an alkyl having from 1 to 15 carbon atoms, where $x_1+x_2=2$, and $x_1$ and $x_2$, independently, is 0, 1, or 2. A specific example of such a compound is Fyrol-6 which is manufactured by the Akzo Chemicals, Inc. Corporation and has the formula

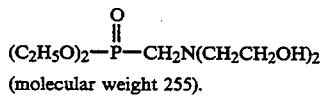

(molecular weight 255).

Another suitable compound has the specific formula

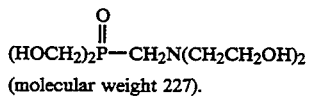

(molecular weight 227).

Another phosphorus type adhesion promoter is represented by the formula

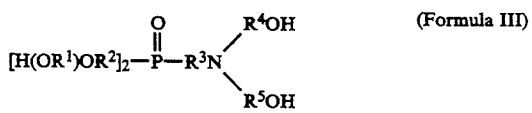

(Formula III)

wherein $R^1$, $R^2$, $R^4$, and $R^5$, independently, is an alkyl having from 1 to 8 carbon atoms, and $R^3$ is hydrogen or an alkyl having 1 to 8 carbon atoms. A specific example is

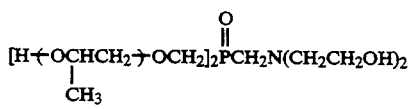

Yet another type of a phosphorus type adhesion promoter is represented by the formula

(Formula IV)

wherein $R^1$ is an alkyl having from 1 to 8 carbon atoms, and $R^2$ is nonexistent or an alkyl having from 1 to 8 carbon atoms, and wherein x is 1, 2, or 3, and wherein y is 0, 1, or 2, and wherein $x+y=3$. Specific examples include

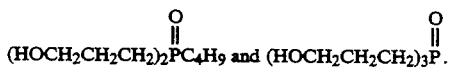

The amount of the phosphorus-containing compounds is generally from about 0.1 to about 15 percent by weight and preferably from 0.5 to 10 percent by weight based upon the total weight of the curative component or system, or from about 0.05 to 7.5 percent by weight and preferably from 0.25 percent to 5 percent by weight based upon the total weight of the curative component and the prepolymer component.

As with the urethane prepolymer component, the curative component can contain various additives, pigments, dyes, fillers, and the like. Such compounds can be utilized in either or both components. Generally, the curative component contains significant amounts of fillers of the type described for use in the urethane prepolymer component. Fumed silica is often utilized to prevent the fillers from settling out. Various pigments and or dyes can be utilized such as those discussed in connection with the urethane prepolymer component. Various other additives can also be used within the curative component.

The ingredients of the curative component are liquid and can be added and mixed in any manner.

The two components of the urethane system are separately maintained. The adhesive is made by blending the two components together utilizing any conventional mixer or blender, etc., the heating to cure and form the adhesive. The cure temperature will vary depending upon the types of ingredients of each component, but generally is from 150° F. to 300° (66° to 149° C.), and preferably from 200° to 250° F. (93° to 121° C.). Mixing time is less than 10 minutes and often from 1 to 4 minutes.

The system is applied to a non-treated or surface treatment free substrate, e.g., a primerless substrate such as FRP, metal or plastic and heated to cure and form an in situ adhesive which bonds said substrates together to form a urethane adhesive composite. The two-component system and urethane adhesive of the present invention is particularly suitable for use in the manufacture of automotive hoods, doors, fenders, front ends, trunk lids, body panels, and the like.

The present invention will be better understood by reference to the following examples which serve to illustrate the invention, but not to limit the same.

EXAMPLES

All parts set forth in the examples are by weight unless otherwise indicated.

EXAMPLE 1

A polyurethane prepolymer was prepared using the following procedure: polypropylene ether triol capped with ethylene oxide, 6000–7000 molecular weight (29 parts), antioxidant (0.4 parts), and fumed silica (0.5 parts) were charged to a clean, dry reactor.

The reactor and its contents were heated with stirring to 110° C. During the heating cycle, powdered talc (13.5 parts) and molecular sieves (5 parts) were added. The reactor was heated to 70°–110° C. under vacuum (26 inches mercury) for 2 hours. Then, 52 parts of liquid methylene bis (4-phenylisocyanate) (Isonate 2191, Modified MDI, manufactured by Dow) was added. The contents of the reactor were mixed for 2 hours at 60°–110° C. The NCO content of the final product is 3.5 meq/gm and the viscosity was 4,000–8,000 cps (Brookfield). The adhesive base was used in all subsequent experiments.

EXAMPLE 2

A polyurethane curative was prepared using the following procedure: A polypropylene ether triol with 21 weight percent grafted acrylonitrile (34 parts), polypropylene ether tetrol of 500 molecular weight (PEP-550, manufactured by BASF) (28.5 parts), phthalocyanine blue (0.7 parts), naphthalene diamine (1.0 parts), fumed silica (0.4 parts), and phosphorus containing polyol Vircol-82 (8.0 parts) were charged to a clean, dry reactor, the reactor was heated to 110° C. while adding powdered talc (30–40 parts). The slurry was heated at 70°–110° C. under vacuum for 2 hours. Then, tin catalyst (0.1–1 parts) was added. The final mixture was stirred and cooled to 30° C. It had a viscosity of 15,000–30,000 cps (Brookfield). This curative was used with the adhesive base described in Example 1 at a base/curative mix ratio of 1/1 to form the final polyurethane adhesive.

Two Component Primerless Organic Phosphorus Containing Urethane Adhesive For Bonding Substrates The two component primerless phosphorus containing urethane adhesive utilized for bonding substrates such as fiber reinforced parts is generally the same as set forth hereinabove with the exception of various modifications set forth herein below.

It has unexpectantly been found that the primerless urethane adhesive having good adhesion need not contain a high ratio of free NCO groups of the prepolymer to hydroxyl groups as well as amine groups of the curative component such as above 1.25 or 1.2, provided than an effective amount of an organic phosphorus compound is utilized.

The urethane adhesive generally utilizes the same prepolymer as noted above except that the polyol intermediate need not be limited to primary hydroxyl groups but may also contain secondary end groups. An example of a secondary hydroxyl end group containing compound is PPG-3025, a polypropylene oxide-based polyether diol, molecular weight 3,000, which contains only secondary hydroxyl groups. The hereinabove described polyether polyols are the preferred polyol intermediate with specific examples including polypropylene ether diols or triols containing primary or secondary end groups and optionally containing grafted acrylonitrile, as well as mixtures thereof. The polyisocyanates utilized in the prepolymer component of the modified adhesive are the same as set forth hereinabove as is the very high excess ratio of NCO to OH groups so that the prepolymer contains free NCO groups. As noted above, such a ratio is generally from about 2 to about 75 or 50, desirably from about 10 to about 40, and preferably from about 15 to about 35. Preferred polyisocyanates include the various diphenylmethane diisocyanates (MDI) and mixtures of MDI with polymeric MDI (e.g.—crude MDI) having an average isocyanate functionality of from about 2 to about 3.2.

The primerless polyurethane adhesive of the present invention generally contains the same compounds in the curing component as noted above such as a polyol curing agent, e.g. mixtures of polypropylene ether triol containing grafted acrylonitrile and polypropylene ether tetrol, which generally serves as a crosslinking agent, a primary amine anti-sag agent such as naphthalene diamine, and a phosphorus compound. The urethane adhesive contains a sufficient amount of primary amine compounds and polyol curing or crosslinking agents so that the equivalent ratio of the free NCO groups of the prepolymer component to the OH plus amine groups, e.g. $NH_2$, of the anti-sag agent is from about 0.90 to about 1.25, desirably less than 1.2 such as from about 0.90 to about 1.19 or 1.18, preferably from about 1.00 to about 1.10 and more preferably from about 1.02 to about 1.08. Such ratio is generally given in terms of an isocyanate index which is defined as follows:

$$\text{Isocyanate Index} = \frac{\text{Equivalents of NCO groups in prepolymer component} \times 100}{\text{Equivalents of OH and NH}_2 \text{ groups in the curative component}}.$$

An important aspect of the present invention is that high equivalent ratios of free NCO groups of the prepolymer to the hydroxyl and amine groups of the curative component are not necessary when one or more of the organic phosphate compounds set forth hereinabove are utilized in effective amounts in that unexpectedly a primerless adhesive composition is produced having good adhesion to substrates. Generally, any of the organic phosphorus compounds can be utilized in an effective amount such as from about 0.1 to about 10 percent by weight, desirably from about 0.5 to about 5 percent, and preferably from about 2 to about 5 percent by weight based upon the total weight of the urethane adhesive composition.

Of the various types of organic phosphorus compounds set forth above, formula I is preferred. A highly preferred organic phosphorus compound has the formula

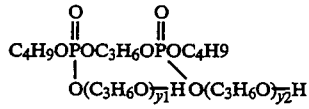

and a molecular weight of about 548 and $y_1 + Y_2 = 3.4$. Another preferred organic phosphorus compound has the formula

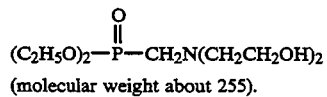

(molecular weight about 255).

Urethane catalysts can also be utilized to adjust open time or pot life of mixed adhesives with suitable catalysts generally including various tertiary amine catalyst such as triethylamine, benzyldimethylamine, triethylenediamine or tetramethylbutanediamine, or various tin compounds known to the art such as stannous carboxylates, for example, stannous acetate, stannous octoate, stannous laurate, stannous oleate; or dialkyl tin salts of carboxylic acids such as dibutyltin diacetate, dibutyltin dilaurate, dibutyltin maleate, dibutyltin disulfide, dibutyltin di-2-ethylhexoate, dilauryltin diacetate and dioctyltin diacetate. Dibutyltin disulfide and dibutyltin dilaurate are preferred.

The amount of urethane catalyst utilized is generally from about 0.01 to about 0.5 parts by weight based upon the total weight of the urethane adhesive composition.

The phosphite containing adhesion composition of the present invention generally need not contain a trimerization catalyst and thus is generally free from the same. Although molecular sieves are generally not utilized in the organic phosphorus polyurethane composition of the present invention, they can be optionally utilized in amounts as set forth hereinabove.

The organic phosphorus urethane adhesive can be utilized to bond a variety of substrates such as SMC, or thermoset or thermoplastic parts reinforced with various fibers (FRP) such as glass, boron, carbon, graphite, or nylon, i.e. aramid fibers. The urethane adhesives of the present invention can also be utilized to bond other substrates including non-plastic substrates such as metal parts, metal housings, or the like.

The organic phosphorus containing polyurethane adhesive of the present invention can be applied to a non-treated or surface treatment free substrate, e.g., a primerless substrate such as FRP, metal or plastic, and heated to form an in situ adhesive which bonds said substrates together to form a urethane adhesive composite. Such adhesive is particular suitable for use in the manufacture of automotive parts such as hoods, doors, fenders, front ends, trunk lids, body panels, and the like.

EXAMPLES

All parts set forth in the examples are by weight unless otherwise indicated.

EXAMPLE 3 (PREPOLYMER)

A polyurethane prepolymer A1 was prepared as follows: polypropylene ether triol capped with ethylene oxide, 6000–7000 molecular weight (31.5 parts), antioxidant (0.6 parts), and fumed silica (0.5 parts) were charged to a clean, dry reactor. The reactor and its contents were heated with stirring to 110° C. During the heating cycle, powdered talc (13.8 parts) and molecular sieves (4.6 parts) were added. The reactor was heated to 70°–110° C. under vacuum (26 inches mercury) for 2 hours. Then, 49 parts of liquid methylene bis(4-phenylisocyanate) (Isonate 2191, Modified MDI, manufactured by Dow) was added. The contents of the reactor were mixed for 2 hours at 60°–110° C. The NCO content of the final product is 3.39 meg/gm, and the viscosity was 4000–8000 cps (Brookfield). The adhesive base was used in all subsequent experiments.

EXAMPLE 4 (CURATIVE)

A polyurethane curative B1 was prepared as follows: A polypropylene ether triol with 21 weight percent grafted acrylonitrile (34 parts), polypropylene ether tetrol of 500 molecular weight (PEP-550, manufactured by BASF) (29.1 parts) phthalocyanine blue (0.7 parts), naphthalene diamine (1.0 part), and fumed silica (0.4 parts) were charged to a clean, dry reactor, the reactor was heated at 110° C. while adding powdered talc (34.5 parts). The slurry was heated at 70°–110° C. under vacuum for 2 hours. Then, tin catalyst (0.2 parts) was added. The final mixture was stirred and cooled to 30° C. It had a viscosity of 15,000–30,000 cps (Brookfield). The OH and NH$_2$ content of Curative B1 is 2.59 meg/gm.

EXAMPLE 5

Example 4 was repeated except polypropylene ether triol with grafted acrylonitrile (32.9 parts), polypropylene ether tetrol PEP-550 (25.4 parts), and phosphorus containing polyol Vircol-82 (6.0 parts). The OH and NH$_2$ content of this curative B2 is 2.51 meg/gm.

EXAMPLE 6

For testing of adhesive strength, standard lap shear specimen were prepared using the procedure: Polyurethane adhesive was mixed from the components described in previous Examples using an adhesive meter-mixing equipment (Model MVR-28, Liquid Control Corp.) with a static type mixing tube. A bead of mixed adhesive was applied along one side of FRP plaque 4"×12". The plaque was placed in the aluminum fixture and a second plaque was aligned on top of the adhesive bead to give a final specimen 7"×12" with a 1"×12" overlap bond area. The aluminum fixture gave a standard 0.03" bond line thickness. The fixture with the bonded sample was placed on the hot press at 121° C. for 4 minutes to cure the adhesive. The final specimen were placed in an air circulating oven at 150° C. for 30 minutes to ensure complete cure. The lap shear samples were tested using standard Instron type testing equipment with a cross-head speed of 0.5"/minute.

EXAMPLE 7

When the isocyanate index of the system is chosen at 100, the addition of a sufficient amount of phosphorus containing polyol Vircol-82 into the curative component shows primerless adhesion on SMC.

TABLE I

Effect of Phosphorus Containing Polyol Vircol-82 on Adhesion

| Base | Curative | Isocyanate Index | Vircol-82 | Lap Shear Strength @ 82° C. |
|---|---|---|---|---|
| A1 (0.8 part) | B1 (1 part) | 105 | None | 460 psi, 66SF/34AF (3170 KPA) |
| A1 | B2 | 108 | Yes | 450 psi, |

TABLE I-continued

Effect of Phosphorus Containing Polyol Vircol-82 on Adhesion

| Base | Curative | Isocyanate Index | Vircol-82 | Lap Shear Strength @ 82° C. |
|---|---|---|---|---|
| (0.8 part) | (1 part) | | | 90SF/10AF (3100 KPA) |

SF = Substrate failure, AF = Adhesion failure.

As apparent from Table I, the utilization of a phosphorus containing polyol yields an improved adhesion inasmuch as the substrate failure amount increased from 66 percent to 90 percent.

EXAMPLE 8

The high isocyanate index at 135 can provide primerless adhesion on SMC substrates, free monomeric isocyanates act as the adhesion promoter. Phosphorus containing polyol Vircol-82 instead of high isocyanate index is able to achieve primerless adhesion on SMC.

TABLE II

| Base | Curative | Isocyanate Index | Vircol-82 | Lap Shear Strength @ 82° C. |
|---|---|---|---|---|
| A1 (1.04 part) | B1 (1 part) | 135 | None | 514 psi, 85SF/15AF (3540 KPA) |
| A1 (0.8 part) | B2 (1 part) | 108 | Yes | 450 psi, 90SF/10AF (3100 KPA) |

As apparent from Table II, unexpectedly good adhesion as demonstrated by the shear failure amount was achieved at a low isocyanate index, i.e. 108.

While in accordance with the Patent Statutes, the best mode and preferred embodiment has been set forth, the scope of the invention is not limited thereto, but rather by the scope of the attached claims.

What is claimed is:

1. An adhesive composition, comprising:
   a two component primerless urethane adhesive system comprising a prepolymer component and a curative component, said prepolymer component made from a hydroxy terminated polyester or polyether intermediate and a polyisocyanate, the amount of said polyisocyanate being an equivalent ratio of at least 2.0 based upon the hydroxy terminated intermediate so that said prepolymer has free NCO groups, said curative component comprising a nitrogen-free polyol having hydroxyl groups, a primary polyamine, and an effective amount of an organic phosphorus compound to yield good adhesion of said urethane adhesive upon cure, the amount of said curative component being such that the equivalent ratio of said free NCO groups in said prepolymer component to said hydroxyl groups and said amine groups of said curative component is from about 0.9 to less than 1.2, and wherein said organic phosphorus compound is represented by the formula

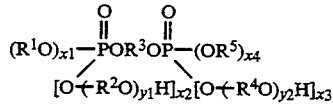

Formula I wherein $R^1$, $R^3$, and $R^5$, independently, is an alkyl having from 1 to 15 carbon atoms, wherein $R^2$ and $R^4$, independently, is an alkyl having from 1 to 6 carbon atoms, where $y_1$ or $y_2$, independently, is from 0 to 20, and wherein $x_1+x_2=2$, wherein $x_3+x_4=2$; and wherein $x_1$, $x_2$, $x_3$, or $x_4$ is 0, 1, or 2, or a compound of the formula

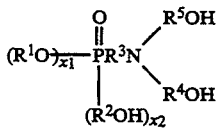

Formula II wherein $R^1$, $R^2$, $R^3$, $R^4$, and $R^5$, independently, is an alkyl having from 1 to 15 carbon atoms, where $x_1+x_2=2$, and $x_1$ and $x_2$, independently, is 0, 1, or 2, or a compound of the formula

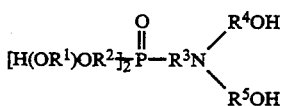

Formula III wherein $R^1$, $R^2$, $R^3$, $R^4$, and $R^5$, independently, is an alkyl having from 1 to 8 carbon atoms, or a compound of the formula

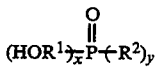

Formula IV wherein $R^1$ is an alkyl having from 1 to 8 carbon atoms, and $R^2$ is nonexistent or an alkyl having from 1 to 8 carbon atoms, and wherein x is 1, 2, or 3, and wherein y is 0, 1, or 2, and wherein $x+y=3$, or combinations of Formula I, II, III, and IV.

2. An adhesive composition according to claim 1, wherein the amount of said polyisocyanate in said prepolymer component is an equivalent ratio of at least 2.0 to about 75, and wherein the equivalent ratio of said free NCO groups in said prepolymer component to said hydroxyl groups and said amine groups of said curative component is from about 0.9 to about 1.18.

3. An adhesive composition according to claim 2, wherein the amount of said organic phosphorus compound is from about 0.1 to about 10 percent by weight based upon the total weight of said urethane adhesive composition.

4. An adhesive composition according to claim 3, wherein the amount of said polyisocyanate in said prepolymer component is an equivalent ratio of at least 10 to about 40, and wherein the equivalent ratio of said free NCO groups in said prepolymer component to said hydroxyl groups and said amine groups of said curative component is from about 1.0 to about 1.10.

5. An adhesive composition according to claim 4, wherein said hydroxy terminated intermediate is polypropylene ether triol, wherein said polyisocyanate is MDI, wherein the amount of said phosphorus compound is from about 2 percent to about 5 percent by weight based upon the total weight of said urethane adhesive composition, and wherein said phosphorus compound is

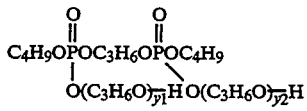

having a molecular weight of about 548 and $y_1+Y_2=$ about 3.4, or a phosphorus compound having the formula

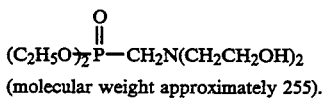

(molecular weight approximately 255).

6. An adhesive comprising:
a primerless urethane adhesive which is the reaction product of a two-component urethane system comprising a urethane prepolymer component and a urethane curative component, said urethane prepolymer component made from a hydroxyl terminated polyester or polyether intermediate and a polyisocyanate, the equivalent ratio of said polyisocyanate to said hydroxyl terminated intermediate being from about 2 to about 75 so that said prepolymer components contains free NCO groups, said urethane curative component comprising a polyol curative having hydroxyl groups therein, a primary polyamine, containing amine groups therein, and an effective amount of an organic phosphorus compound to yield an adhesive upon reaction of said cure component with said prepolymer component, the equivalent ratio of said free NCO groups to said hydroxyl groups of said polyol curative and said amine groups of said polyamine being from about 0.90 to less than 1.2, and wherein said organic phosphorus compound is represented by the formula

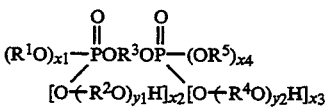

Formula I wherein $R^1$, $R^3$, and $R^5$, independently, is an alkyl having from 1 to 15 carbon atoms, wherein $R^2$ and $R^4$, independently, is an alkyl having from 1 to 6 carbon atoms, where $y_1$ or $y_2$, independently, is from 0 to 20, and wherein $x_1+x_2=2$, wherein $x_3+x_4=2$; and wherein $x_1$, $x_2$, $x_3$, or $x_4$ is 0, 1, or 2, or a compound of the formula

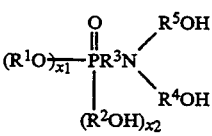

Formula II wherein $R^1$, $R^2$, $R^3$, $R^4$, and $R^5$, independently, is an alkyl having from 1 to 15 carbon atoms, where $x_1+x_2=2$, and $x_1$ and $x_2$, independently, is 0, 1, or 2, or a compound of the formula

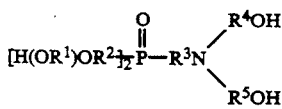
Formula III wherein $R^1$, $R^2$, $R^3$, $R^4$, and $R^5$, independently, is an alkyl having from 1 to 8 carbon atoms, or a compound of the formula

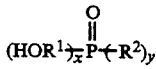
Formula IV wherein $R^1$ is an alkyl having from 1 to 8 carbon atoms, and $R^2$ is nonexistent or an alkyl having from 1 to 8 carbon atoms, and wherein x is 1, 2, or 3, and wherein y is 0, 1, or 2, and wherein $x+y=3$, or combinations of Formula I, II, III, and IV.

7. An adhesive according to claim 6, wherein the equivalent ratio of said polyisocyanate to said hydroxyl terminated intermediate is from about 2 to about 50, wherein the amount of said organic phosphorus compound is from about 0.1 percent to about 10 percent by weight based upon the total weight of said urethane adhesive composition.

8. An adhesive according to claim 7, wherein said equivalent ratio of said free NCO groups to said hydroxyl groups of said polyol curative and said amine groups of said polyamine is from about 0.9 to about 1.18.

9. An adhesive according to claim 8, wherein said equivalent ratio of said free NCO groups to said hydroxyl groups of said polyol curative and said amine groups of said polyamine is from about 1.00 to about 1.08, wherein said hydroxyl terminated intermediate is polypropylene ether triol, wherein said polyisocyanate is MDI, wherein the amount of said phosphorus compound is from about 2 percent to about 5 percent by weight based upon the total weight of said urethane adhesive composition, and wherein said phosphorus compound is

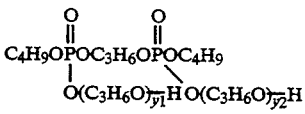

having a molecular weight of about 548 and $y_1+Y_2=$ about 3.4, or a phosphorus compound having the formula

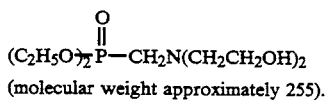

(molecular weight approximately 255).

10. An adhesive composite containing at least two surface treatment-free substrates therein, said surface treatment-free substrates bonded together by the cured urethane adhesive of claim 6.

11. An adhesive composite containing at least two surface treatment-free substrates therein, said surface treatment-free substrates bonded together by the cured urethane adhesive of claim 8.

12. An adhesive composite containing at least two surface treatment-free fiberglass reinforced plastic substrates therein, said surface treatment-free fiber reinforced plastic substrates bonded together by the urethane adhesive of claim 9.

* * * * *